United States Patent [19]
Ueda

[11] Patent Number: 5,495,835
[45] Date of Patent: Mar. 5, 1996

[54] IDLING SPEED CONTROL METHOD AND APPARATUS FOR AN INTERNAL COMBUSTION ENGINE

[75] Inventor: Katsunori Ueda, Tokyo, Japan

[73] Assignee: Mitsubishi Jidosha Kogyo Kabushiki Kaisha, Tokyo, Japan

[21] Appl. No.: 167,857

[22] PCT Filed: Apr. 23, 1993

[86] PCT No.: PCT/JP93/00532

§ 371 Date: Feb. 23, 1994

§ 102(e) Date: Feb. 23, 1994

[87] PCT Pub. No.: WO93/22569

PCT Pub. Date: Nov. 11, 1993

[30] Foreign Application Priority Data

Apr. 24, 1992 [JP] Japan .................................. 4-106571

[51] Int. Cl.$^6$ ............................. F02D 41/16; F02D 43/04
[52] U.S. Cl. ................................ 123/339.11; 123/339.21
[58] Field of Search .................................. 123/339, 352

[56] References Cited

U.S. PATENT DOCUMENTS

| | | | |
|---|---|---|---|
| 4,492,195 | 1/1985 | Takahashi et al. | 123/339 |
| 4,509,477 | 4/1985 | Takao et al. | 123/339 |
| 4,709,334 | 11/1987 | Abe et al. | 364/431.05 |
| 5,094,213 | 3/1992 | Dudek et al. | 123/339 X |

FOREIGN PATENT DOCUMENTS

| | | |
|---|---|---|
| 59-120752 | 7/1984 | Japan . |
| 3-111652 | 5/1991 | Japan . |
| 3-36145 | 5/1991 | Japan . |
| 4-27768 | 1/1992 | Japan . |
| 4-50446 | 2/1992 | Japan . |

OTHER PUBLICATIONS

Transalation of "Automotive Technology", vol. 37, No. 9, 1983, pp. 986–991.

Primary Examiner—Tony M. Argenbright

[57] ABSTRACT

In an idling speed control method for adjusting the amount of intake air supplied to an internal combustion engine so that the engine speed matches a target speed when the engine is idling, a value of a stroke period or speed of the engine is detected. Further, a target torque improvement rate Mi, indicative of excess or deficiency of an engine output torque caused by a response delay in an intake system of the engine, is predicted in accordance with the detected value of the stroke period. Also, in accordance with the predicted torque improvement rate Mi, an ignition timing is delayed or advanced and the fuel supply quantity is increased or decreased to make an air-fuel ratio rich or lean. This eliminates the excess or deficiency of the intake air supply due to the response delay in the intake system relative to fluctuations in idling speed, thereby permitting stable idling even at low speed.

46 Claims, 11 Drawing Sheets

IDLING SPEED CONTROL METHOD AND APPARATUS FOR AN INTERNAL COMBUSTION ENGINE

TECHNICAL FIELD

The present invention relates to an idling speed control method and apparatus for an internal combustion engine, and more particularly, to an idling speed control method and apparatus capable of ensuring stable idling of an engine even at a low speed.

BACKGROUND ART

When idling an engine, in general, the amount of intake air supplied to the engine is adjusted to control an idling speed close to a target speed, thereby improving a fuel consumption of the engine. Typically, to regulate the intake air amount during idling, the opening degree of a bypass valve, provided in a bypass passage bypassing a throttle valve and having both ends connected to an intake passage, is adjusted in accordance with a difference between a detected value of the engine speed and a target idling speed. This thereby increases or decreases the amount of air (intake air amount) supplied to the engine through the bypass passage so as to suppress fluctuations in the engine speed, thus ensuring stable idling.

A further improvement of fuel consumption of the engine can be achieved by reducing idling speed. Especially when driving in an urban area where the engine runs at an idling speed more frequently, the effect of the improved fuel consumption is significantly higher. Idling at a lower speed, however, causes the engine speed to easily fluctuate because of a deteriorated combustion condition due to an increase in an internal EGR amount, increased friction in the engine, and deteriorated stability of a loop transfer system of intake air—engine output torque—engine speed, so that stability of idling is badly affected. Especially, if the intake system of an MPI (Multi-Point Injection) type engine wherein fuel is injected and supplied from fuel injection valves provided for respective cylinders includes a large-volume surge tank, the stability of the loop transfer system and hence idling stability are deteriorated because of the larger volume of the intake system.

An L-jetronic type control system which employs an air flow sensor is known as an engine control system featuring highly stable idling. In a typical L-jetronic system, the amount of air passing through the throttle valve per cylinder stroke is directly measured by the air flow sensor, as the actual amount of intake air supplied to a cylinder, and an amount of fuel according to the measurement result is injected. Thus, when the engine speed (repetition of intake per unit time) decreases, the amount of fuel supplied to one cylinder increases in inverse proportion to the decreased amount in engine speed, so that an air-fuel ratio is made richer. Accordingly, the L-jetronic system exhibits good controllability as long as the engine is subjected to idling under a specific condition.

Actually, however, even when the engine is running in a steady idling condition, fluctuations in combustion may take place, or minute fluctuations may occur in rotational speed due to a manufacturing error of a crank angle sensor or the like. The L-jetronic system has a high air-fuel ratio modulation working gain, therefore, the working gain may be excessive when the aforesaid fluctuations happen. In this case, an excessive change in the air-fuel ratio occurs, thus resulting in unstabilized idling. To avoid such inconvenience, the control gain in controlling the air-fuel ratio of the engine mounted on a commercially available vehicle must be reduced, whereby the controllability is accordingly deteriorated. Additionally, if no limitation on the manipulating amount or manipulating signal associated with the air-fuel ratio is provided in the L-jetronic system, then the air-fuel ratio tends to be set to an excessively large value (overlean) when the engine speed suddenly increases. This may cause misfire.

Further, a technique for stabilizing idling for a D-jetronic type engine, which employs a sensor for detecting a pressure in an inlet pipe, has been proposed ("Automotive Technology" Vol. 37, No. 9, 1983, pp. 986–991). In this method, an actual negative pressure in the inlet pipe in a few strokes ahead is predicted based on a variation (differential value) in the negative pressure in the inlet pipe per stroke, and the fuel injection amount is calculated in accordance with the predicted value, whereby the delay or time lag in detection of the negative pressure in the inlet pipe is compensated, to improve the stability of idling. This proposed method, which allows a dead zone or a rich/lean upper value to be set as necessary, has flexibility that makes it possible to avoid the danger of misfire or the like found in the L-jetronic method described above. In practical use, however, this method presents a problem in that the differential values of the information on the negative pressure in the inlet pipe cannot be detected with high accuracy because of intake pulsation. Further, the proposed method presents a problem in that, if the differential gain is set to a large value so as to obtain a sufficient detection delay compensation effect, then considerations must be given even to the influences exerted by an A/D conversion error on the information on the negative pressure in the inlet pipe.

Further, when driving at an extremely slow speed with use of a lower gear position, the engine speed and load are close to the idling region, so that a periodical rotation fluctuation (below 1 Hz), similar to idle hunting, may take place occasionally. When it occurs, a vehicle generates an uncomfortable longitudinal shake called a surge. This is referred to as a crawling surge. This phenomenon is considered to be caused by a vibration developed from the first order delay in the intake system, which corresponds to the fluctuation in the idling revolution and is amplified by the torsional resonance of a driving system.

To solve problems of this kind, the present inventor has proposed a method for stabilizing idling (unexamined Japanese patent publication no. H4 50446), which method is based on the information on engine speed which is highly stable to be used as a control information with lower noises or fluctuations compared to the information on the negative pressure in the inlet pipe. According to this proposed method, an instantaneous value of the information on the engine speed is determined, and the instantaneous value is subjected to first order delay processing. Then, an ignition timing is delayed or advanced and fuel supply amount is increased or decreased in accordance with a difference between the instantaneous value and the value obtained by the first delay processing. However, a technological concept for optimally associating the difference with the correction amounts (more generally, associating the detected information with the manipulating amount for engine control) was not entirely clear.

SUMMARY OF THE INVENTION

An object of the present invention is to provide an idling speed control method for an internal combustion engine, which method establishes clear association of detected information with a manipulating amount for engine control, thereby eliminating the instability in idling due to a response delay in an intake system or the like, and ensuring stable idling even at low speed.

To fulfill the above-mentioned object, according to the present invention, there is provided an idling speed control method for adjusting the amount of intake air supplied to an internal combustion engine so that the engine speed matches a target speed when the engine is idling. This control method comprises the steps of: detecting a value of a predetermined parameter representative of a rotation state of an engine output shaft; predicting a torque correction factor, indicative of excess or deficiency of the engine output torque due to a response delay in an intake system of the engine, in accordance with the detected value of the predetermined parameter; and controlling the engine output torque in accordance with the predicted torque correction factor.

Preferably, an instantaneous value of the predetermined parameter is detected, and the detected instantaneous value is subjected to first order delay processing. Then, a ratio of the instantaneous value of the predetermined parameter to the value obtained by the first order delay processing is determined, and the torque correction factor is predicted in accordance with the determined ratio. More preferably, a stroke period in the engine is determined as the predetermined parameter, and a ratio of the instantaneous value of the stroke period to a value obtained by subjecting the instantaneous value of the stroke period to first order delay processing is determined as the torque correction factor. Alternatively, the engine speed is determined as the predetermined parameter, and a ratio of a value, obtained by subjecting the instantaneous value of the engine speed to first order delay processing, to the instantaneous value of the engine speed is determined as the torque correction factor. Preferably, in the first order delay processing, a value of the predetermined parameter after first order delay processing is calculated in accordance with an arithmetic represented as a function of the instantaneous value of the predetermined parameter, a value obtained in the preceding first order delay processing, and a weight constant equivalent to a time constant. More preferably, the weight constant is represented as a function of the volume of the engine inlet pipe and the volume of one cylinder of the engine.

Preferably, the intake air amount is adjusted in accordance with a difference between a detected value of the engine speed and the target idling speed.

Preferably, the engine output torque is controlled by correcting at least one of the ignition timing of the engine and the fuel supply amount in accordance with the predicted torque correction factor. More preferably, when the torque correction factor falls within a predetermined range, the correction of the fuel supply amount is prohibited, and only the ignition timing is corrected in accordance with the torque correction factor. The predetermined range of the torque correction factor, within which the correction of the fuel supply amount should be prohibited, is set to a range wherein the torque correction factor takes minute values. Preferably, at least one of a lean limit value and rich limit value of a correction amount of the fuel supply amount is provided, and the correction amount is limited to at least one of the limit values. The lean limit value of the correction amount is set to such a value that, if the correction amount exceeds the value, misfire may occur in the engine, and the rich limit value is set to such a value that, if the correction amount exceeds the value, the engine output torque does not effectively increase. At least one of an advance limit value and delay limit value of a correction amount of the ignition timing is provided, and the correction amount is limited to the at least one limit value. The advance limit value of the correction amount is set to such a value that, if the correction amount exceeds the value, the engine output torque does not effectively increase, and the delay limit value is set to such a value that, if the value takes the delay limit value, the engine output torque decreases by a specified rate.

As described above, according to the idling speed control method for an internal combustion engine of the present invention, the value of the predetermined parameter indicative of the rotation state of the engine output shaft is detected, the torque correction factor indicative of excess or deficiency of the engine output torque caused by a response delay in the intake system of the engine is predicted in accordance with the detected value of the predetermined parameter, and the engine output torque is controlled in accordance with the predicted torque correction factor. Therefore, the value of the predetermined parameter, as the detected information, and the manipulating amount for torque control for compensating for the response delay in the intake system are clearly associated with each other by the torque correction factor, thus permitting accurate compensation of the excess or deficiency of the torque caused by the response delay in the intake system (more specifically, the delay in the intake air supply relative to an actual fluctuation in the idling speed) which is especially marked in a large-volume intake system.

As a result, a restoring torque can be quickly generated even when the idling speed varies due to disturbance or the like, and the fluctuation in the engine speed can be suppressed to a minimum, ensuring stabilized idling and minimized crawling surge. In addition, since stable idling can be performed even at low speed, the specific fuel consumption of the engine can be effectively reduced.

According to a particular aspect of the present invention wherein the torque correction factor is determined in accordance with the ratio of the instantaneous value of a predetermined parameter (e.g., the stroke period of the engine or the engine speed) to the value obtained by the first order delay processing, the excess or deficiency of the torque caused by first order delay, which is mainly attributable to the response delay in the intake system, can be appropriately compensated. Further, according to this aspect, as it will be discussed in detail later, the torque correction factor represents a ratio of an indicated torque of the engine provided with the intake system having a response delay, to an indicated torque of an engine provided with an ideal intake system wherein the volume of the inlet pipe can be ignored and there is no response delay. Therefore, idling stability corresponding to the ideal intake system can be accomplished.

According to a particular aspect of the present invention, the intake air amount is adjusted in accordance with the difference between the detected value of the engine speed and the target idling speed, or the engine output torque is controlled by correcting the engine ignition timing or the fuel supply amount in accordance with the predicted torque correction factor, or only the ignition timing is corrected when the torque correction factor takes a value falling within the predetermined range. Therefore, the control of the intake air amount or the torque can be further optimized, enabling further improved idling stability.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Concept of engine torque control

Figure 1:
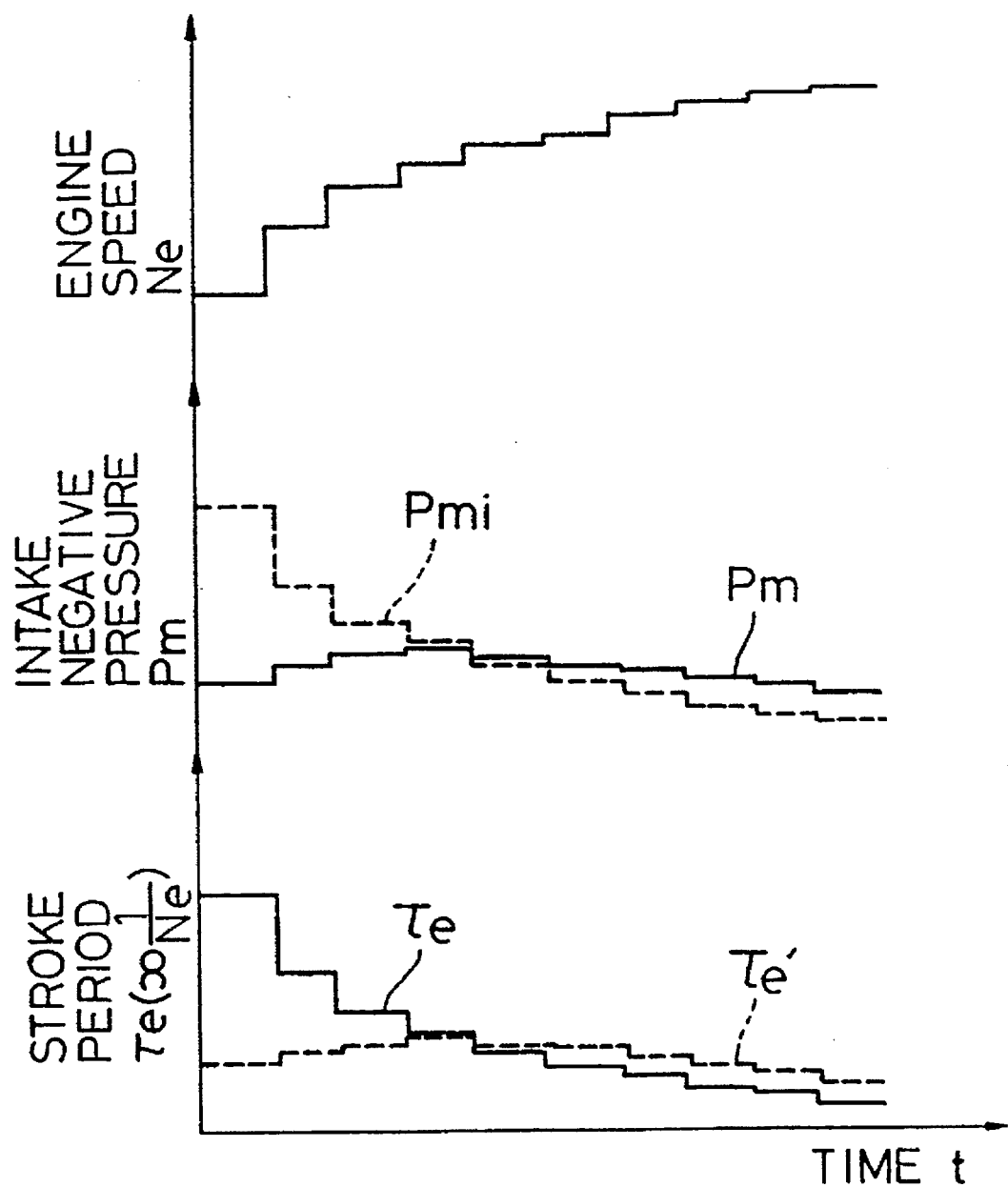
FIG. 1 is a graph showing a relationship between the negative pressure in the inlet pipe and the stroke period to explain a basic principle of a method of the present invention.

First, a theoretical basis of an idling speed control method according to the present invention, on which a torque correction factor (torque improvement rate) is determined in accordance with a stroke period τe of an engine, will be explained.

It is assumed that a transmission system, fuel control system and ignition timing control system of an engine are configured as follows:

The fuel supply amount and the ignition timing are controlled in accordance with the negative pressure PB in the inlet pipe by a D-jetronic type engine control system.

Each of fuel injection valves is disposed near an inlet port of an associated cylinder, and fuel to be supplied to each cylinder is injected into the associated inlet port at the timing when the top dead center is nearly reached or left in the intake stroke.

The ignition timing is advance-controlled by means of electronic control.

The volumetric efficiency of the engine is 1.0 (constant).

When the engine is run at a basic ignition timing with a constant air-fuel ratio, an air amount Qc to be fed into the cylinder concerned and an indicated torque Ti are proportional to each other.

Friction of the engine is constant regardless of the engine speed.

The delay in fuel transport is small enough to be ignored.

Under the aforementioned assumption (in particular, under the assumption such that the first, fourth and seventh requirements among the seven requirements listed above are satisfied) a torque improvement rate Mi which is necessary for obtaining the indicated torque for an ideal intake system can be expressed by the following formula (1), if the pressure, intake volume, and indicated torque in an engine equipped with an ordinary intake system having a response delay are represented by Pm, Qc, and Ti, respectively, while the pressure, intake volume, and indicated torque of an engine equipped with an ideal intake system in which the inlet pipe volume can be ignored and hence there is no response delay, are represented by Pmi, Qci, and Tii, respectively.

$$Mi = (Tii/Ti) = (Qci/Qc) \quad (1)$$
$$= (Pmi/Pm)$$

In case that rotation fluctuation from the steady state occurs, the following formulas (2) through (4) in respect of state variables in n'th stroke can be derived, if the amount of air passing through the throttle valve during a stroke is represented by Qth.

$$Qci(n)=Qth(n) \quad (2)$$

$$Qc(n)=Kv \times Qc(n-1)+(1-Kv) \times Qth(n) \quad (3)$$

$$Kv=Vm/(Vm+Vc) \quad (4)$$

The formula (3) indicates the first order delay response of the air amount Qc. Kv is a weight constant equivalent to a time constant, Vm is the volume of the inlet pipe, and Vc is the volume of one cylinder.

When the throttle valve is open for idling, the amount of air Qth passing through the throttle valve per unit time stays constant. Therefore, the formula (2) can be modified to a formula (5) shown below. In the formula (5), τe(n) denotes the stroke period of the engine as described above.

$$Qci(n)=Qth(n)=\text{Constant} \times \tau e(n) \quad (5)$$

If the stroke period τe(n) is subjected to the first order delay processing in such a manner that the following formula (6) is fulfilled, then the formula (3) is converted to a formula (7) shown below:

$$\tau e'(n)=Kv \times \tau e'(n-1)+(1-Kv) \times \tau e(n) \quad (6)$$

$$Qc(n)=\text{Constant} \times \tau e'(n) \quad (7)$$

where τe' denotes the stroke period which has been subjected to the first order delay processing.

Hence, the formula (1) can be modified to the following formula (8) by using the formulas (5) and (7).

$$Mi(n) = (Tii(n)/Ti(n)) \quad (8)$$
$$= (Qci(n)/Qc(n))$$
$$= (Pmi(n)/Pm(n))$$
$$= (\tau e(n)/\tau e'(n))$$

As it is obvious from the formulas (8) and (6), the target torque improvement rate Mi can be represented as a function of the stroke period τe. As will be discussed later, the torque improvement rate Mi can be represented as a function of the engine speed Ne (more generally, a predetermined parameter representative of a rotation state of the engine output shaft).

FIG. 1 shows changes in the engine speed Ne, the pressure PB in the inlet pipe, and the stroke period τe as time t elapses when the engine fluctuates in revolution from the steady state.

Next, an embodiment of the idling speed control method for an internal combustion engine according to the present invention will be explained with reference to the drawings.

Figure 2:
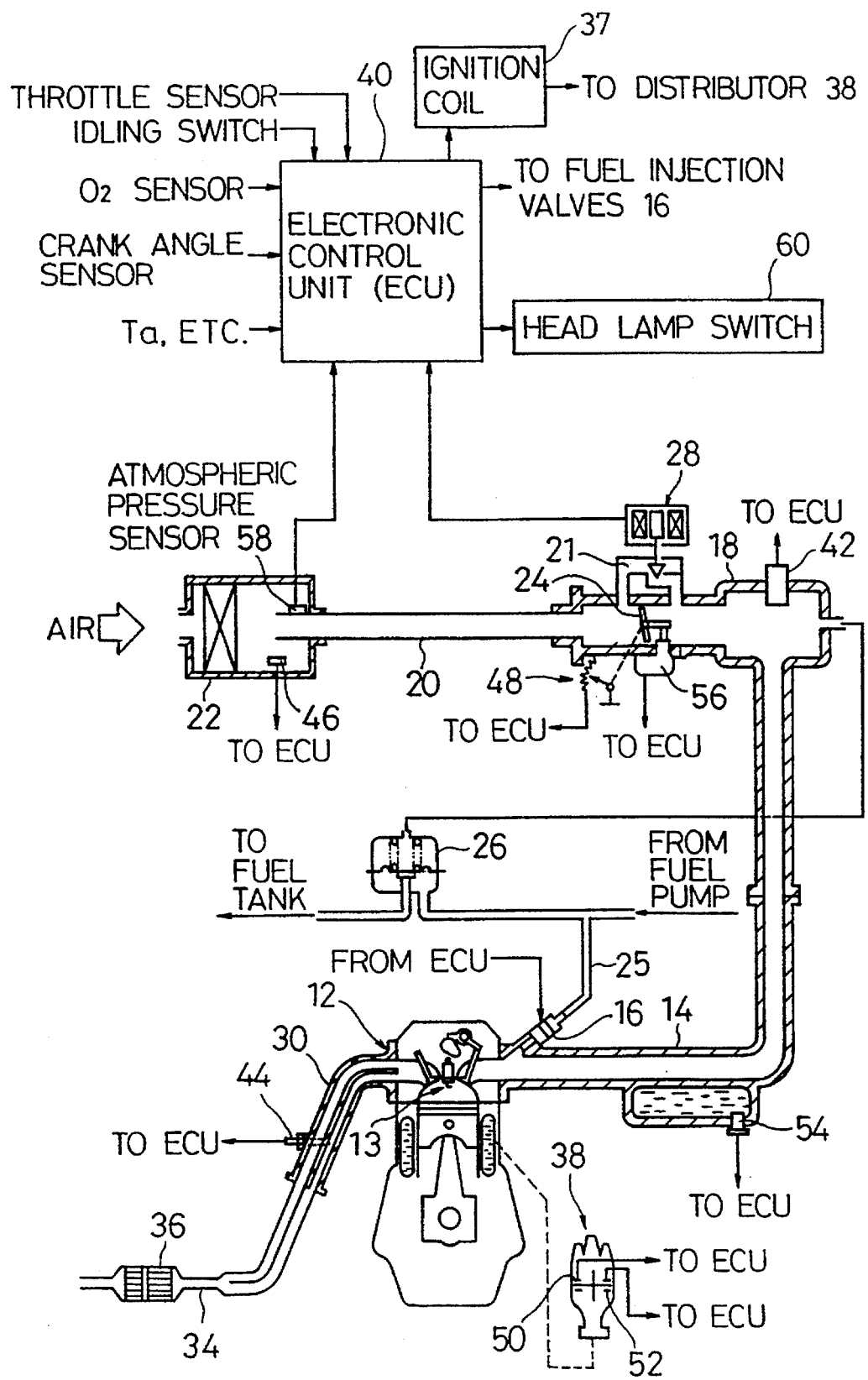
FIG. 2 is a block diagram showing a schematic configuration of a control unit of an internal combustion engine to which a method of the present invention is applied.

FIG. 2 shows a schematic configuration of a control unit for an internal combustion engine to which the control method of the present invention is applied. This control unit is applied, for example, to a 4-cylinder gasoline engine (hereinafter simply referred to as "engine") 12.

An intake manifold 14 connected to cylinders of the engine 12 is provided with electromagnetic fuel injection valves 16 each disposed in the vicinity of an associated inlet port. One end of an inlet pipe 20 is connected to the intake manifold 14 via a surge tank 18, and an air cleaner 22 is installed at the other end (the end opened to the air) of the inlet pipe 20. A throttle valve 24 is disposed in the middle of the inlet pipe 20. Fuel is supplied to each fuel injection valve 16 from a fuel pump, not shown, via a fuel path 25, with the fuel pressure adjusted to a constant value by a fuel pressure regulator 26.

The inlet pipe 20 is provided with a bypass path 21 which bypasses the throttle valve 24, and the bypass path 21 is provided with a bypass valve 28. This bypass valve 28, which is driven by, for example, a pulse motor to change the valve opening degree, is connected to an electronic control unit (ECU) 40, to be discussed later. The valve opening degree is controlled by driving signals supplied from the electronic control unit 40, so as to regulate the amount of auxiliary air supplied to the engine 12 via the bypass path 21.

An exhaust manifold 30 is connected to the exhaust side of each cylinder of the engine 12, and an air-side end of the exhaust manifold 30 is connected to an exhaust pipe 34. In the middle of the exhaust pipe 34, a three way catalytic converter (catalytic exhaust gas after-treatment unit) 36 is disposed. Further, the exhaust manifold 30 is provided with an $O_2$ sensor 44 for detecting the amount of oxygen contained in the exhaust gas. The $O_2$ sensor 44 is electrically connected to the input side of the electronic control unit 40 to supply oxygen concentration detection signals to the electronic control unit 40.

The cylinders are each provided with a spark plug 13 which is connected to the electronic control unit 40 via a distributor 38 and an ignition coil 37. When an electric current supplied to the primary coil of the ignition coil 37 from a driving circuit, not shown, of the electronic control unit 40 is cut off, a high voltage is generated in the secondary coil. This causes a spark to leap at the spark plug 13, thereby igniting a fuel-air mixture in the combustion chamber of each cylinder. The timing for igniting the fuel-air mixture (ignition timing) is controlled in accordance with the driving condition. Incidentally, advancing the ignition timing from the standard advance position during idling usually increases the engine torque, while delaying it decreases the engine torque.

The electronic control unit 40 mainly comprises a central processing unit, a memory for storing control programs for idling revolution control and for calculation of fuel supply amount, ignition timing, etc., and for storing various program variables, etc., and input/output units. The memory includes a nonvolatile battery backup RAM for retaining stored information even after the engine 12 is stopped, in addition to a ROM and RAM.

The fuel injection valve 16 described above is electrically connected to the output side of the electronic control unit 40, and is opened by driving signals supplied from the electronic control unit 40 to inject and supply a desired amount of fuel to each cylinder as it will be described later in detail. In addition to the $O_2$ sensor 44, various sensors for detecting the operating state of the engine 12 are connected to the input side of the electronic control unit 40 to which their detection signals are supplied. These sensors include a negative pressure sensor 42 mounted on the surge tank 18 for detecting the negative pressure PB in the inlet path (inlet pipe) at the downstream of the throttle valve 24; an intake air temperature sensor 46 provided in the air cleaner 22 for detecting the intake air temperature Ta; a throttle opening sensor 48 for detecting the valve opening degree of the throttle valve 24; a crank angle sensor 50 provided on the distributor 38 connected to the cam shaft for generating a pulse signal (TDC signal) each time it detects the top dead center or a specified crank angle position slightly before the top dead center; a cylinder discrimination sensor 52 mounted on the distributor 38 for detecting that a particular cylinder (e.g., the first cylinder) is in a specified crank angle position (e.g., the compression upper dead point or an angle position slightly before that); a water temperature sensor 54 for detecting the cooling water temperature TW of the engine 12; an idle switch 56 for detecting a fully-closed position of the throttle valve 24; an atmospheric pressure sensor 58 for detecting the atmospheric pressure Pa; an air conditioner switch, not shown, for detecting the operating condition of an air conditioner; a head lamp switch 60 for detecting an ON/OFF state of a head lamp; and a battery sensor for detecting battery voltage.

Since the crank angle sensor 50 generates the TDC signal for every 180-degree crank angle, the electronic control unit 40 can detect the stroke period τe from the TDC signal pulse generating interval, and to calculate the engine speed Ne from a reciprocal of the stroke period τe. Further, the electronic control unit 40, which stores the ignition sequence of the cylinders, i.e., the sequence of fuel supply to the individual cylinders, is capable of determining to which cylinder it should inject and supply the fuel next, since the cylinder discrimination sensor 52 detects the specified crank angle position of the particular cylinder.

As it will be described in detail later, in accordance with the detection signals of the sensors described above, the electronic control unit 40 detects the operating conditions, including the prescribed idling condition, high-load operating condition, low-load operating condition, decelerating fuel cut operating condition and $O_2$ feedback control operating condition. It further calculates the fuel injection amount, i.e., the valve opening time TINJ of the fuel injection valves 16, and the optimum ignition timing θSA, which are suitable to the detected engine operating condition. The electronic control unit 40 then supplies the driving signal based on the calculated valve opening time TINJ to each fuel injection valve 16 to open the valve, thereby injecting and supplying a specified fuel amount to each cylinder. Finally, it supplies the driving signal based on the calculated ignition timing θSA from the driving circuit to the ignition coil 37, thereby igniting the air-fuel mixture.

The details of an engine speed control procedure executed by the electronic control unit 40 at the time of idling will now be presented with reference to the program flowcharts.

Idling engine speed control

Figure 3:
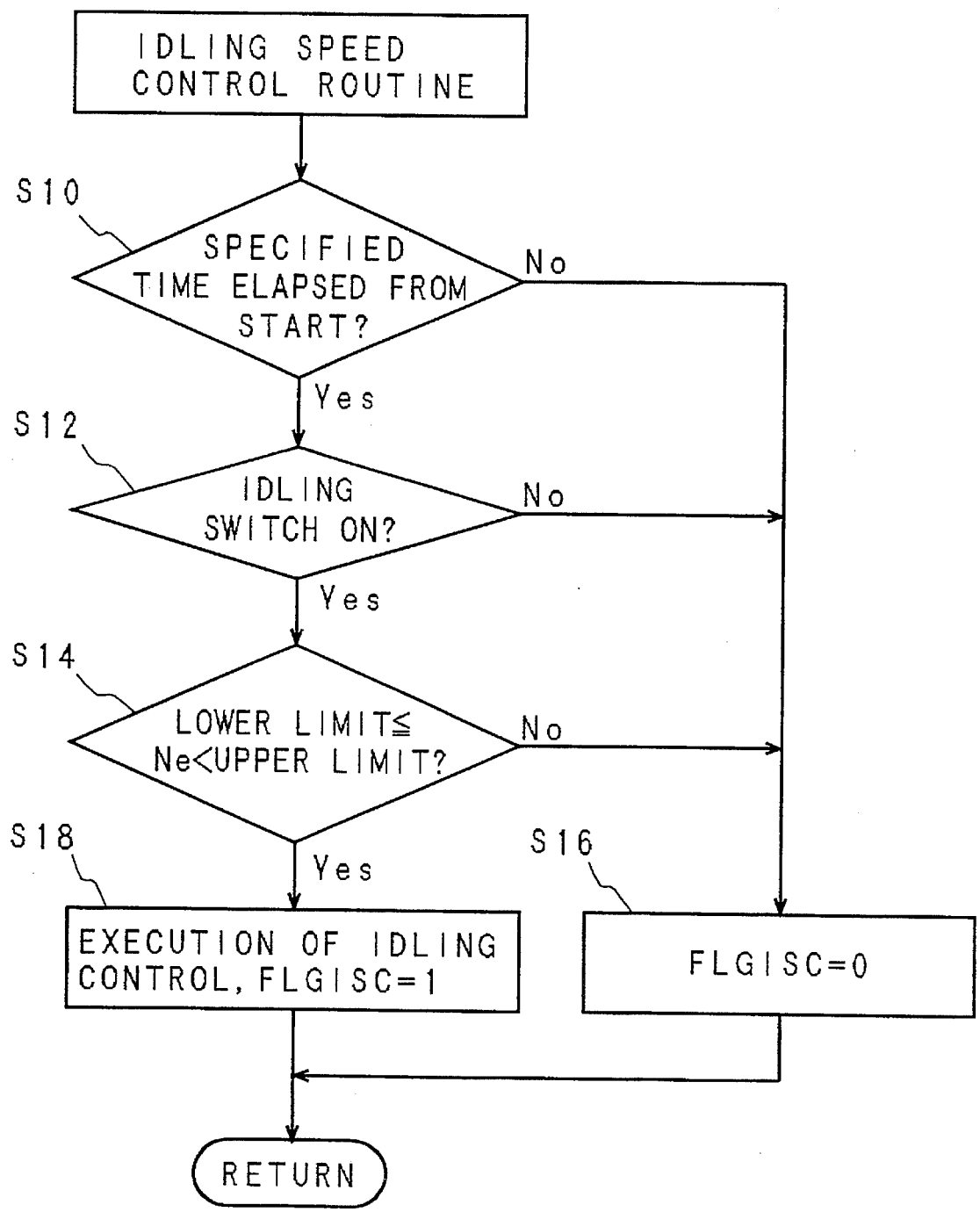
FIG. 3 is a flowchart of an idling speed control routine executed by an electronic control unit 40 shown in FIG. 2.

FIG. 3 shows the flowchart of an idling speed control routine executed by the electronic control unit 40. Steps S10 through S14 are provided to make a determination as to whether the engine 12 is in a specified operating condition under which idling speed control may be executed. First, in the step S10, it is determined whether a specified time (e.g., 1 minute) has passed since the engine 12 was started. Immediately after the engine is started, the operation is unstable and a problem may occur if the engine speed feedback control is executed. In the step S12, it is determined whether the idle switch 56 has issued an ON signal. In other words, it is determined whether the throttle valve 24 is fully closed. In the step S14, it is determined whether the engine speed Ne is within a predetermined range defined by upper and lower limits.

The electronic control unit 40 determines whether all those conditions are fulfilled, and if any of them is not fulfilled, then it advances to a step S16 wherein it sets a flag value FLGISC to 0 and terminates the idling speed control routine. In this case, the idling speed control by the bypass valve 28 is not carried out. The flag value FLGISC is a program control variable for storing whether the idling speed control is being executed, and it is used mainly for the ignition timing control and an air-fuel ratio correction factor arithmetic operation routine to be discussed later.

On the other hand, if all the conditions described above are satisfied, then the electronic control unit proceeds to a step S18 where it executes the idling speed control, sets the flag value FLGISC to 1, and terminates the idling speed control routine. As long as all the conditions described above are satisfied, the step S18 is repeatedly executed.

For instance, in the idling speed control method which is not limited to the following example, the valve opening degree of the bypass valve 28 is PID-controlled in accordance with the difference between the engine speed Ne detected by the crank angle sensor 50 and the target idling speed, so as to keep the engine speed Ne in the vicinity of the target idling engine speed. The target idling speed is set to an appropriate value in accordance with, for example, the engine cooling water temperature detected by the water temperature sensor 54, the ON/OFF states of the air conditioner switch and the head lamp switch, the operating condition of the oil pump which supplies hydraulic oil to a power steering.

Ignition timing control

Figure 4:
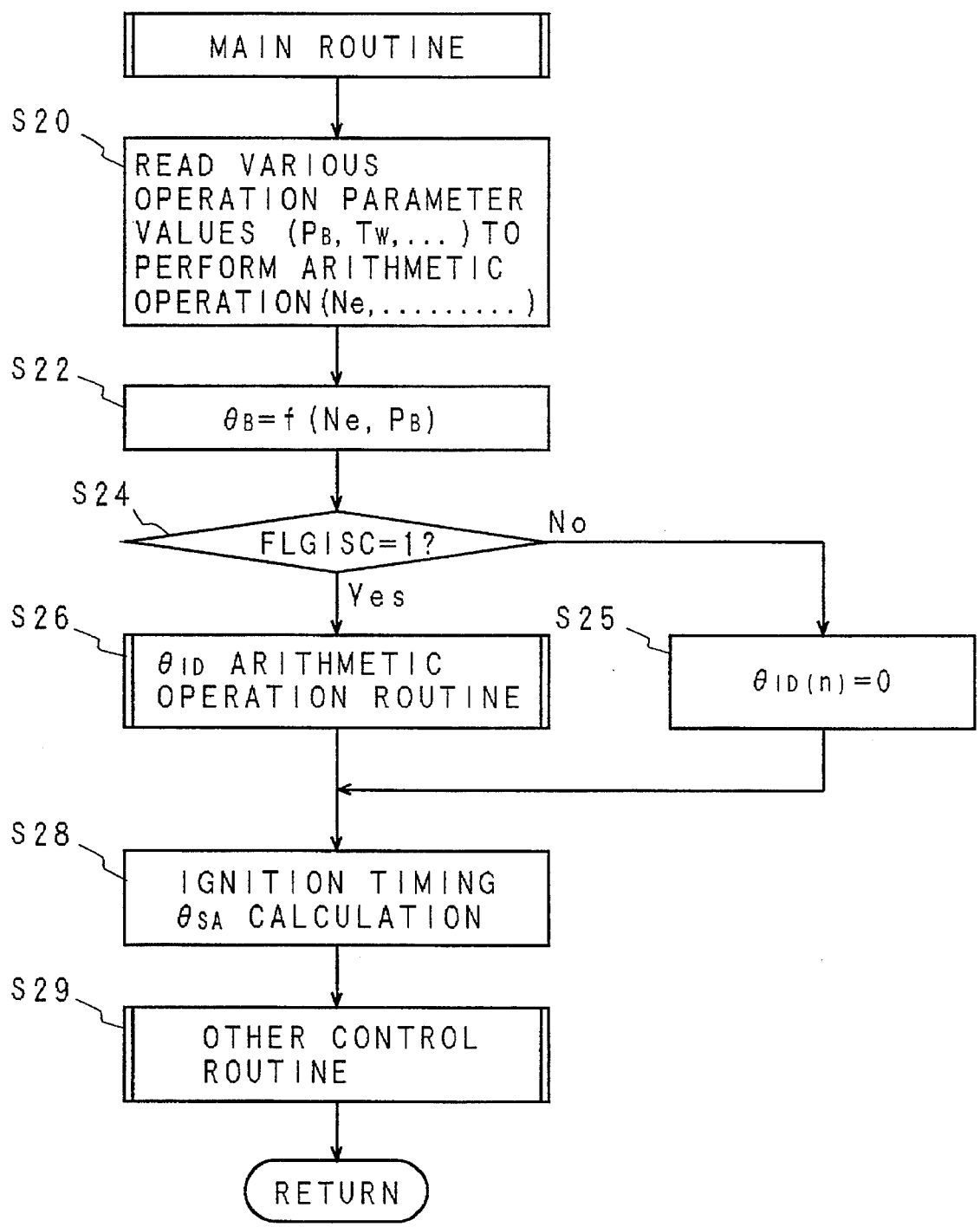
FIG. 4 is a flowchart of a main routine wherein the ignition timing is calculated.

FIG. 4 shows the main routine of the engine control. In this main routine, the ignition timing control for stabilizing idling at the time of the idling speed control is carried out. The electronic control unit 40 first reads the detection signal values from the aforesaid sensors in a step S20, subjects them to filtering, amplification and A/D conversion as necessary, subjects them to arithmetic operation processing as necessary, and stores driving parameter values necessary for engine control. The engine speed Ne is calculated by multiplying the reciprocal of the stroke period τe, which is detected by a crank interrupt routine to be discussed later, by a prescribed constant.

Then, the electronic control unit proceeds to a step S22 wherein it sets a reference ignition timing θB in accordance with the detected engine speed Ne and negative pressure PB in the inlet pipe. The reference ignition timing θB is set by reading a value, which corresponds to the engine speed Ne and the negative pressure PB in the inlet pipe, from an ignition timing map stored beforehand in the memory.

Next, the electronic control unit determines whether the flag value FLGISC is 1, i.e., whether the engine 12 is in the operating condition which allows the execution of the idling speed control (step S24). If the judgment result is negative (No), then the electronic control unit proceeds to a step S25 wherein it sets the idling stabilizing correction value θID to the value 0 before further proceeds to a step S28 which will be discussed later.

If the judgment result in the step S24 is affirmative (Yes), then the electronic control unit executes a routine for calculating the idling stabilizing correction value θID (step S26).

Figure 5:
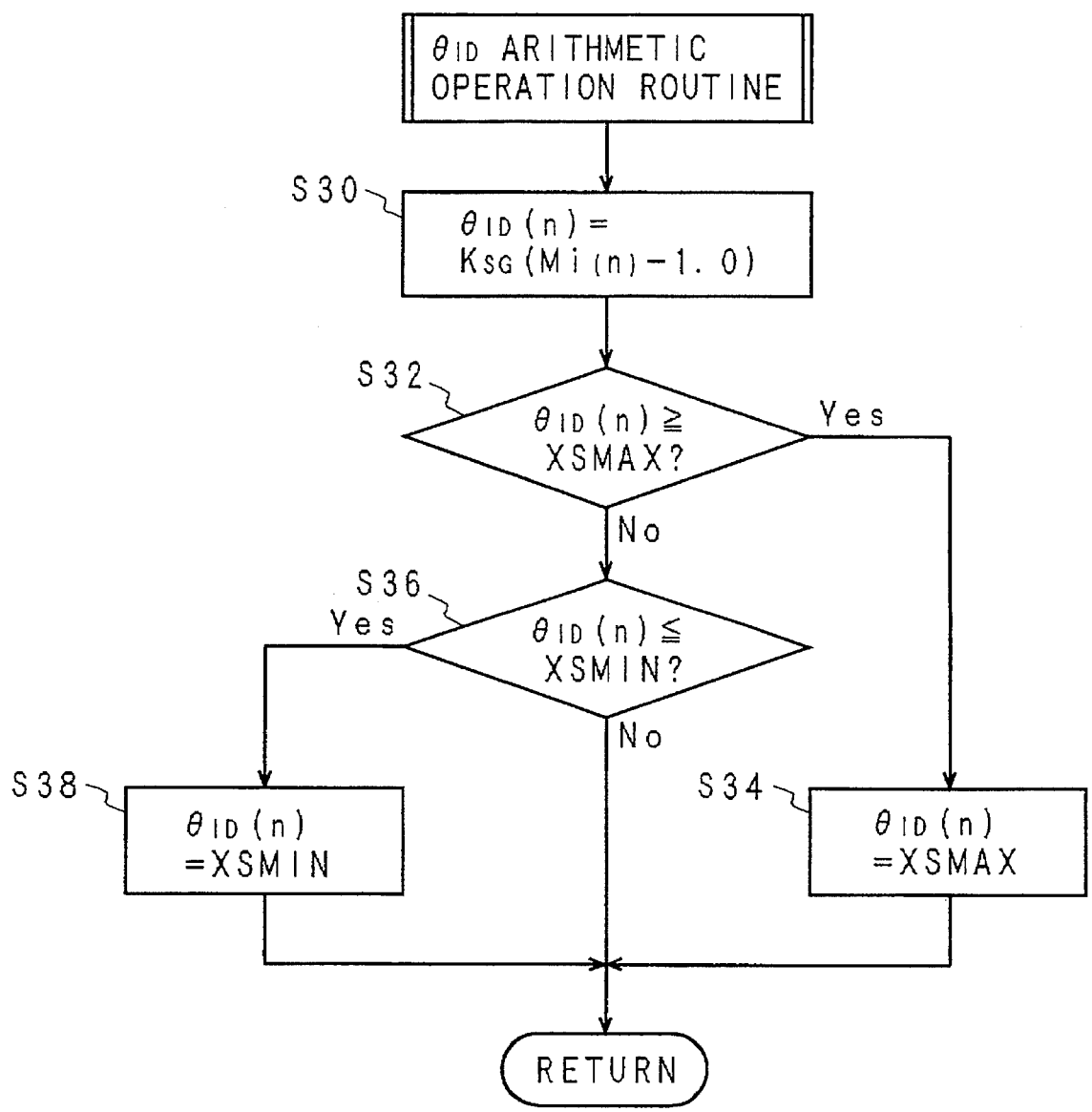
FIG. 5 is a flowchart of an arithmetic operation routine for an idling ignition timing correction value θID.
Figure 6:
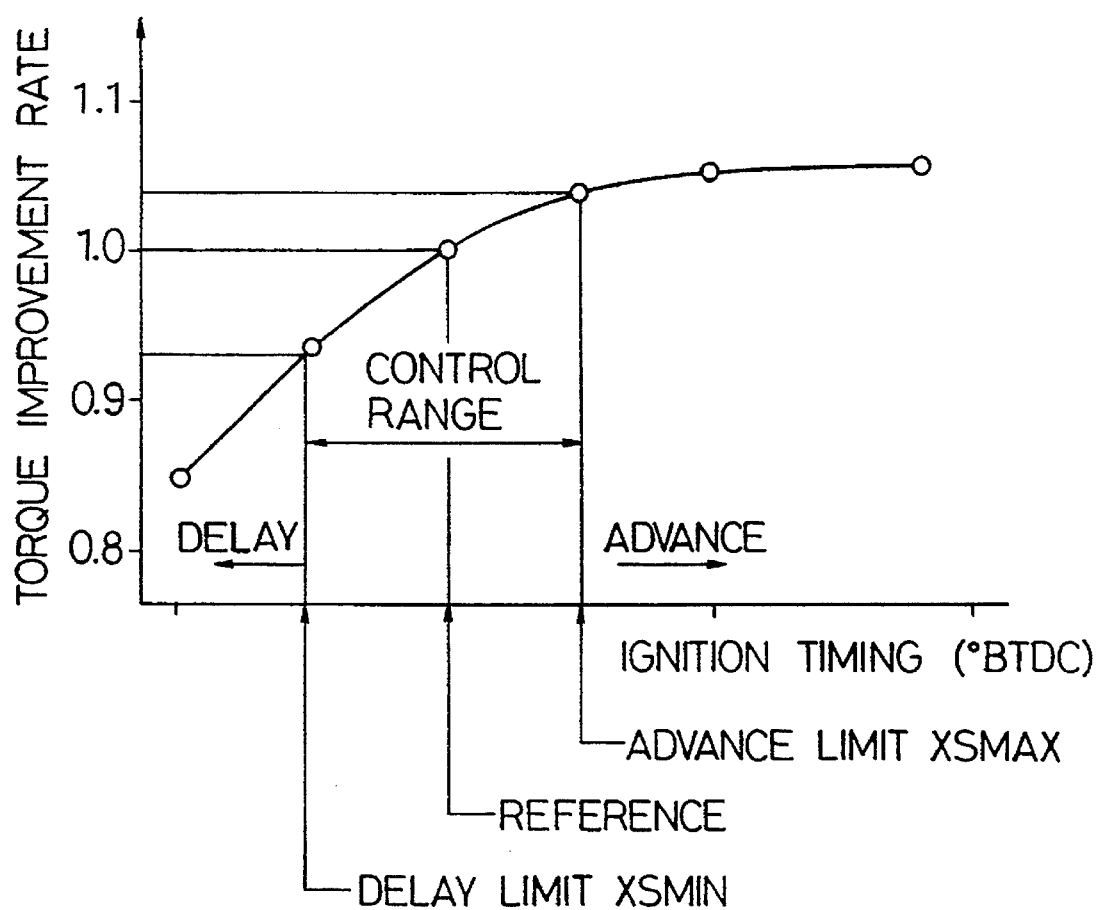
FIG. 6 is a graph showing a relationship between the ignition timing and a torque improvement rate during idling drive.

FIG. 5 shows a routine for calculating the idling stabilizing correction value θID. The electronic control unit 40 calculates the idling stabilizing correction value θID(n) for the present stroke in accordance with the following formula (S1) (step S30).

$$\theta ID(n) = KSG \times (Mi(n) - 1.0) \tag{S1}$$

where KSG is the correction factor (control gain), and Mi(n) is the target torque improvement rate previously described, which are calculated in the crank angle interrupt routine to be discussed later and stored in the memory, and are read out therefrom for use. FIG. 6 shows a relationship between the torque improvement rate Mi and the ignition timing in a case where the engine 12 is run at a specified idling speed (e.g., 600 rpm) and at a reference air-fuel ratio (e.g., a 17 air-fuel ratio) of the idling. A range within which a nearly linear proportion relationship is established between the torque improvement rate Mi and the ignition timing is set as the control range. In the illustrated example, an upper limit value XSMAX and a lower limit value XSMIN for the ignition timing are set. The upper limit value is limited to such a value that no significant torque improvement can be expected if the ignition timing is set toward the advance side beyond the upper limit value, while the lower limit value is set to such a value that makes it possible to obtain a torque reduction rate of, for example, approximately 6%.

When the setting of the idling stabilizing correction value θID(n) is completed, the upper and lower limit values of the correction value θID(n) are checked in steps S32 through S38. More specifically, in the step S32, it is determined whether the correction value θID(n), which has been set this time, is equal to or larger than the upper limit value XSMAX (e.g., 5°). If the judgment result is affirmative, then the electronic control unit proceeds to the step S34 wherein it resets the correction value θID(n), which has been set, to the upper limit value XSMAX. If the judgment result of the step S32 is negative, then the electronic control unit goes to the step S36 wherein it determines whether the correction value θID(n), which has been set this time, is equal to or less than the lower limit value XSMIN (e.g., −5°). If the judgment result is affirmative, then the electronic control unit proceeds to the step S34 wherein it resets the correction value θID(n), which has been set, to the lower limit value XSMIN. If the correction value θID(n), which has been set this time, is within the range defined by the upper and lower limit values and hence the judgment result of the step S36 is negative, then the electronic control unit retains the value, which has been set in the step S30. It then terminates the θID arithmetic operation routine.

Depending on the case, one or both of the upper limit value checking process and the lower limit value checking process may be omitted.

Referring back to FIG. 4, the electronic control unit advances to the step S28 wherein it calculates an ignition timing advance value θSA according to the following formula (S2):

$$\theta SA = \theta B + \theta ID \tag{S2}$$

The electronic control unit 40 supplies the ignition signal to the ignition coil 37 by using the ignition timing advance value θSA, which has been set as described above, and causes the spark plug 13 to ignite in the crank angle position corresponding to the set ignition timing advance value θSA. The ignition timing at this time is advanced or delayed by the correction made in accordance with the idling stabilizing correction value θID. If the ignition timing is advanced, then the torque is increased according to the correction value θID, while the torque is decreased according to the correction value θID if the ignition timing is delayed.

Upon completion of the arithmetic operation of the ignition timing SA described above, the electronic control unit 40 executes other control routine to be executed in this main routine (step S29), and terminates the main routine.

Air-fuel ratio control

Figure 7:
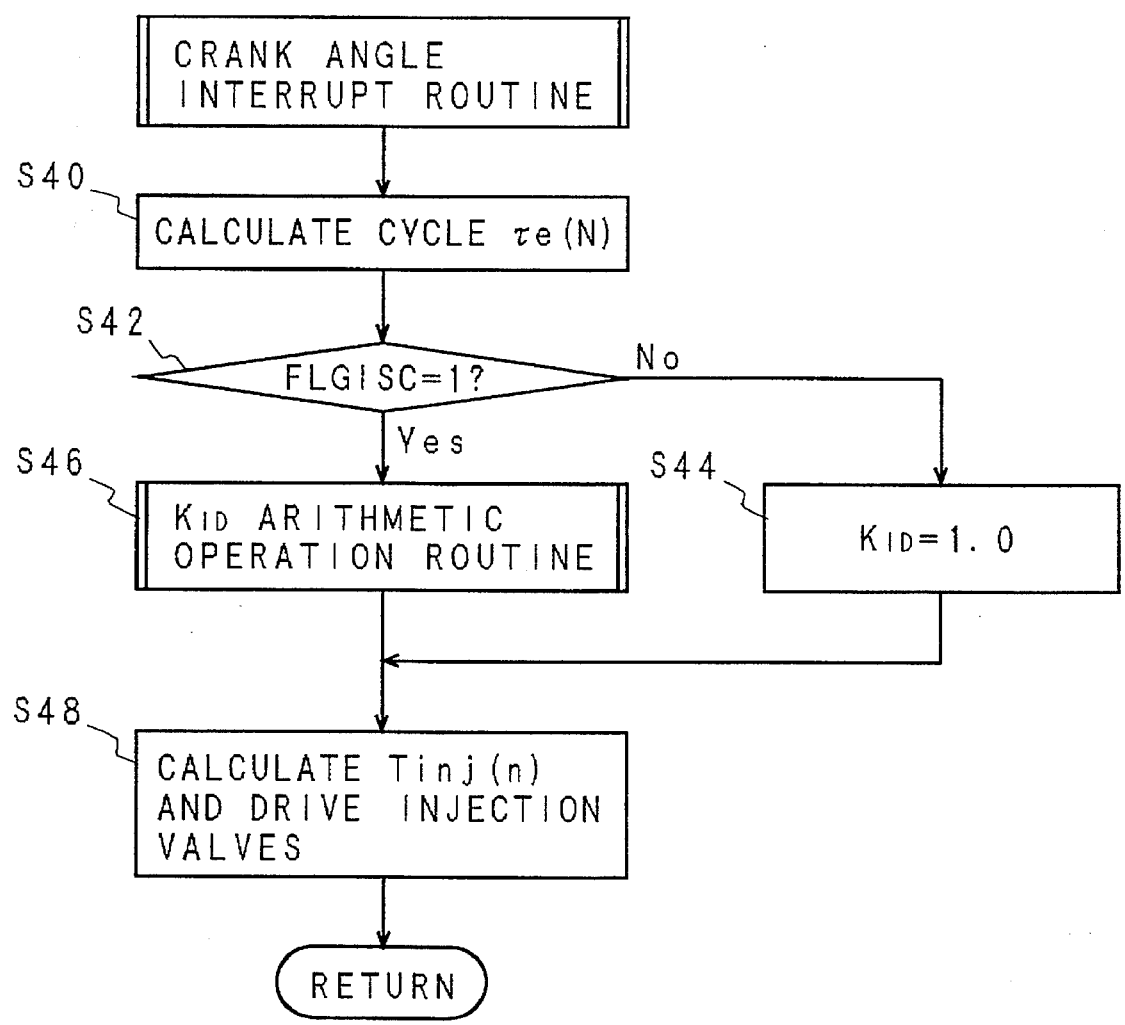
FIG. 7 is a flowchart of a crank angle interrupt routine wherein a valve opening time TINJ of a fuel injection valve 12 is calculated.
Figure 8:
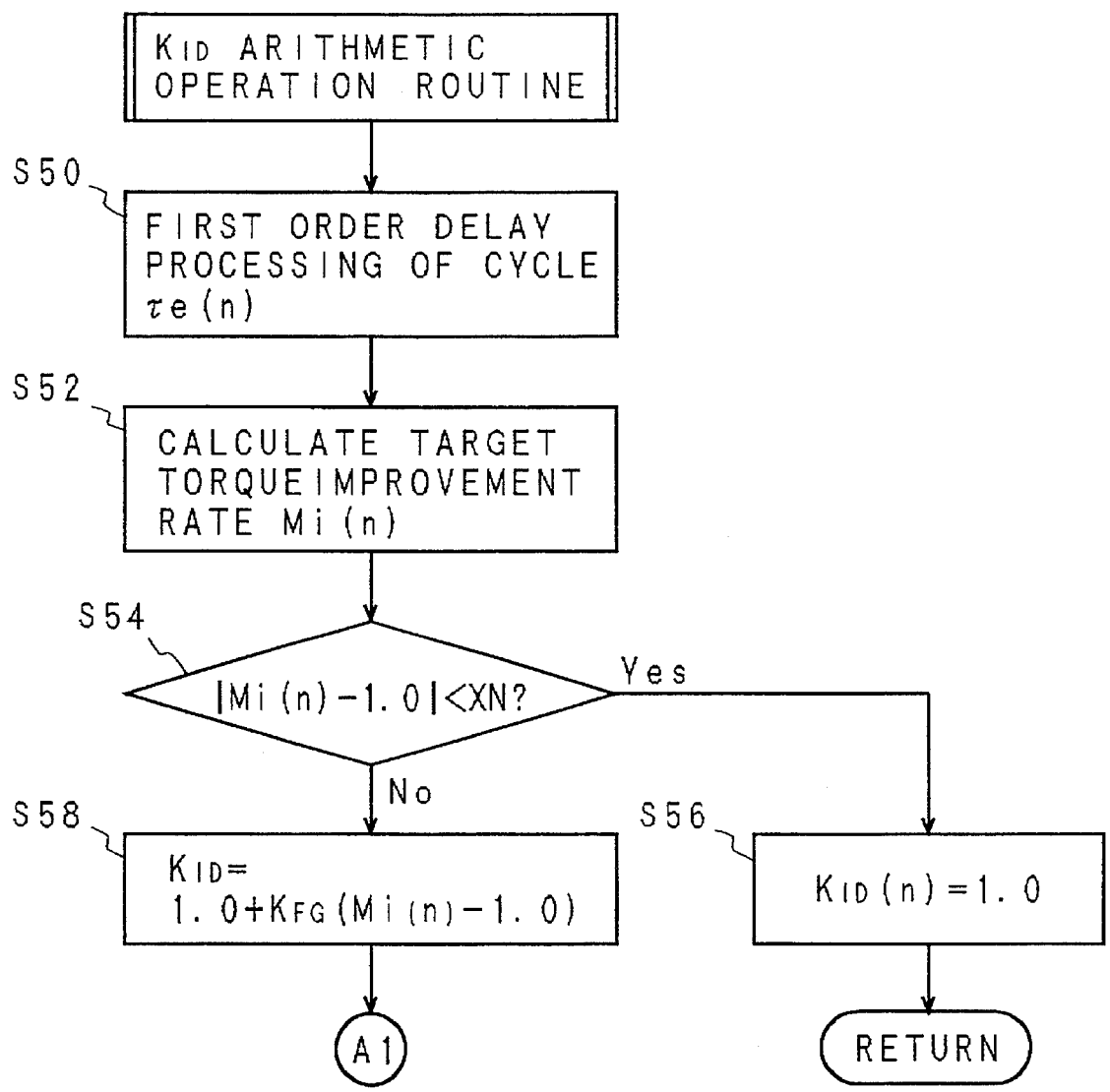
FIG. 8 is part of a flowchart of an arithmetic operation routine for an air-fuel ratio correction factor KID.
Figure 9:
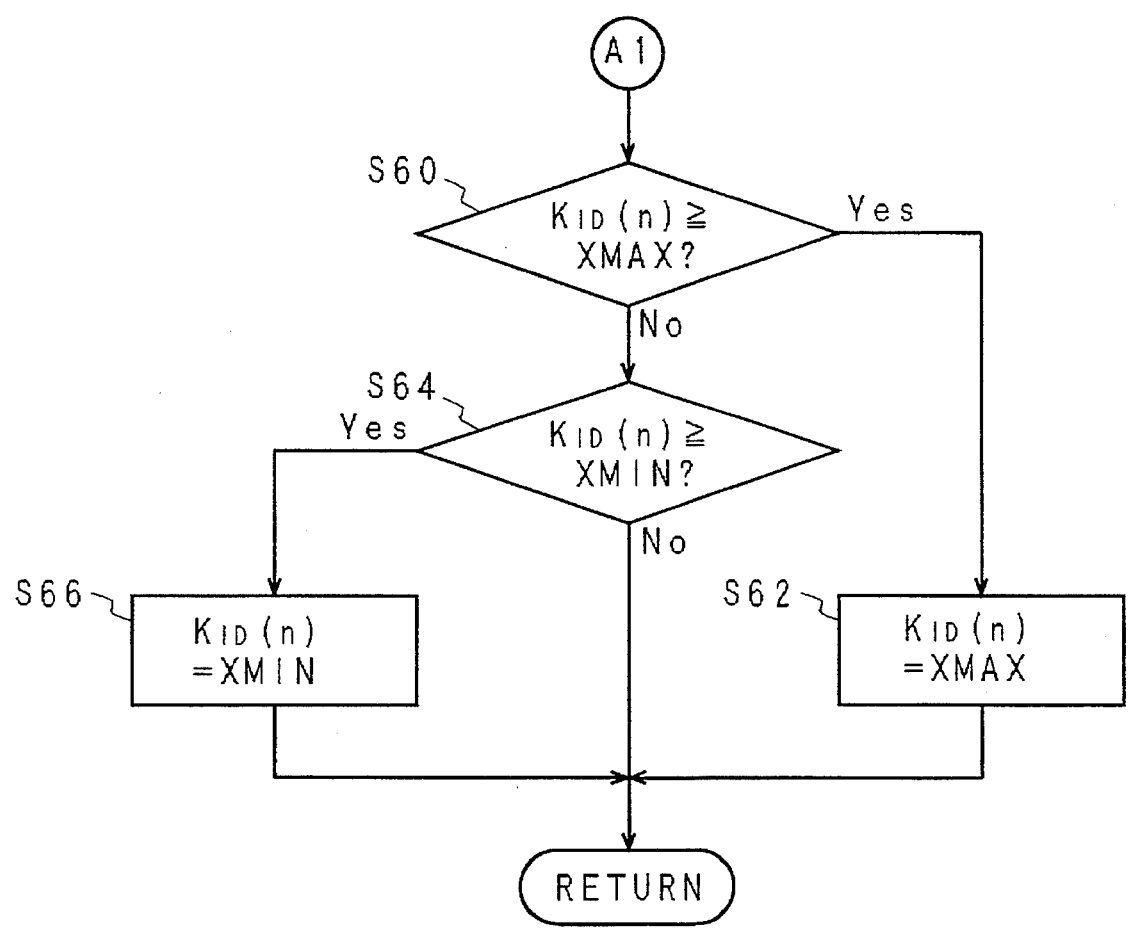
FIG. 9 is a remaining flowchart continuing from the steps shown in FIG. 8.

FIG. 7 through FIG. 9 show the crank angle interrupt routines which are executed each time the crank angle sensor 50 detects the specified crank angle positions. In the routines, an air-fuel ratio correction factor KID for stabilizing the idling at the time of the idling speed control is calculated, and the fuel amount corrected by this correction factor KID is supplied to the engine 12. In a step S40 of FIG. 7, the electronic control unit 40 calculates the stroke period τe(n) for the present cylinder. The stroke period τe(n) is determined by measuring the time from the moment when the step S40 was carried out in the preceding cycle of this routine to the moment when the step S40 is carried out in the present cycle of this routine. To this end, for instance, the electronic control unit 40 reads the present output of a timer (not shown) at the moment when the step S40 is executed and also reads the preceding output from the memory. Further, the control unit deducts the preceding timer output from the present timer output, to thereby determine the stroke period τe(n). Then, the electronic control unit determines whether the flag value FLGISC is 1, i.e., whether the engine 12 is in the operating state which permits the execution of the idling speed control (step S42). If the judgment result is negative (No), then the control unit goes to a step S44 wherein it sets the idling stabilizing correction factor value KID to a value 1.0 before it further proceeds to a step S48 to be discussed later.

If the judgment result in the step S42 is affirmative (Yes), then the control unit proceeds to a step S46 wherein it carries out a routine for calculating the idling stabilizing correction factor value KID.

FIG. 8 and FIG. 9 show a routine for calculating the idling stabilizing correction factor value KID. The electronic control unit 40 first subjects the stroke period τe(n) to the first order delay processing (step S50). In the first order delay processing step, the stroke period τe'(n) after first order delay processing is calculated according to the aforesaid formula (6). The time constant Kv used in the first order delay processing is set to a value of 0.85 to 0.95 according to the previous formula (4) and the specifications of the engine. Then, the target torque improvement rate Mi(n) is calculated from the instantaneous value τe(n) of the stroke period and the value τe'(n) obtained by subjecting the instantaneous value to the first order delay processing (step S52). The arithmetic operation of the target torque improvement rate Mi(n) is executed according to the formula (8) described above.

Next, the electronic control unit determines whether an absolute value of the difference between the target torque improvement rate Mi(n) and the value 1.0 is equal to or less than a specified XM (e.g., 0.03), i.e., whether the target torque improvement rate Mi(n) is a minute value falling within the dead zone (step S54). If the target torque improvement rate Mi(n) is a minute value within the dead zone, then the electronic control unit advances to a step S56 wherein it sets the idling stabilizing correction factor value KID to the value 1.0, and terminates the routine. This means that the engine torque control by an air-fuel ratio adjustment based on the correction factor value KID is not conducted.

On the other hand, if the judgment result of the step S54 is negative, then the electronic control unit proceeds to a step S58 wherein it calculates the idling stabilizing correction factor value KID for the present stroke according to a formula (F1) shown below:

$$KID(n) = 1.0 + KFG \times (Mi(n) - 1.0) \tag{F1}$$

where KFG is the constant (control gain).

Figure 10:
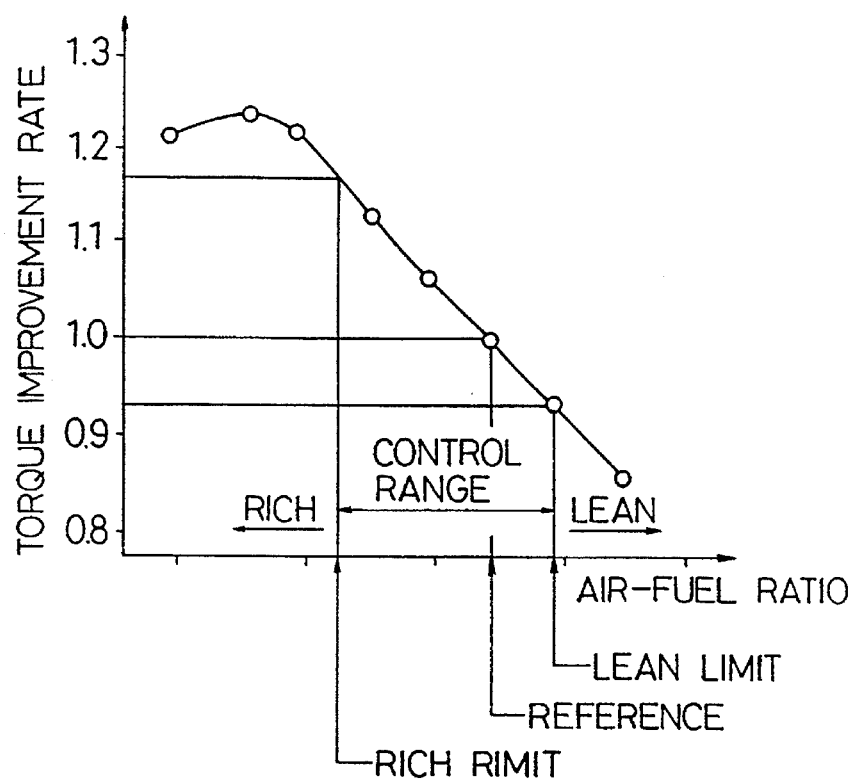
FIG. 10 is a graph showing a relationship between the air-fuel ratio and the torque improvement rate during the idling drive.

FIG. 10 shows a relationship established between the torque improvement rate Mi and the air-fuel ratio in a case where the engine 12 is run at a specified idling speed (e.g., 600 rpm) and at the idling reference ignition timing (e.g., 10° BTDC). A range within which a nearly linear proportion relationship is established between the torque improvement rate Mi and the air-fuel ratio is set as a control range. In the illustrated example, a lean upper limit value and a rich lower limit value relative to the reference air-fuel ratio are set. If the air-fuel ratio is set to a value which is equal to or higher than the lean upper limit value, there is a danger of misfire, and if it is set to a value which is equal to or lower than the rich lower limit value, then no torque improvement can be expected. The formula (F1) is set to match the aforementioned linear proportion relationship which is to be established between the torque improvement rate Mi and the air-fuel ratio. The idling stabilizing correction factor value KID, which is set in the step S58, is set to a value (on the rich side) which increases the fuel injection amount if the engine speed Ne drops (if the torque improvement rate Mi is larger than the value 1), while it is set to a value (on the lean side) which decreases the fuel injection amount if the engine speed Ne rises (if the torque improvement rate Mi is smaller than the value 1).

Upon completion of the arithmetic operation of the idling stabilizing correction factor value KID, the upper and lower limit values of the correction factor value KID(n), which have been set as described above, are checked in steps S60 through S66. More specifically, in the step S60, it is determined whether the correction factor value KID(n), which has been set in the present cycle, is equal to or larger than the rich upper limit value XMAX (e.g., 1.15). If the judgment result is affirmative, then the electronic control unit proceeds to the step S62 wherein it resets the set correction factor value KID(n) to the upper limit value XMAX. If the judgment result of the step S60 is negative, then the electronic control unit proceeds to the step S64 wherein it decides whether the correction factor value KID(n), which has been set in the present cycle, is equal to or less than the lean lower limit value XMIN (e.g., 0.97). If the judgment result is affirmative, then electronic control unit goes to the step S66 wherein it resets the set correction factor value KID(n) to the lower limit value XMIN. If the correction factor value KID(n), which has been set in the present cycle, is a value within the range defined by the upper and lower limit values and hence the judgment result of the step S64 is negative, then the electronic control unit retains the value which has been set in the step S58, and terminates the routine. Depending on the case, one or both of the upper limit value checking process and the lower limit value checking process may be omitted.

Upon completion of the setting of the idling stabilizing correction factor value KID, the electronic control unit 40 returns to the step S48 of FIG. 7 wherein it calculates the valve opening time TINJ(n) of the fuel injection valve 16 according to the following formula (A1) using the aforesaid correction factor value KID(n):

$$TINJ(n)=TB(n) \times KID(n) \times K + TD \quad (A1)$$

where TB is a reference valve opening time which is set in accordance with the negative pressure PB in the inlet pipe and the engine speed Ne, and which is read from a reference valve opening time map stored beforehand in the memory. K denotes other correction factors including a correction factor which is set in accordance with the engine cooling water temperature TW, a feedback correction factor which is set in accordance with the oxygen concentration detected by the $O_2$ sensor 44, a correction factor which is set in accordance with the intake air temperature Ta and the atmospheric pressure Pa, an acceleration increasing amount correction factor which is set in accordance with the valve opening speed of the throttle valve 24, a fuel increasing amount correction after the fuel is cut off, and an engine start increasing amount correction. TD denotes a dead time correction value which is set in accordance with the battery voltage.

Over a time period corresponding to the valve opening time TINJ(n), which has been calculated as described above, the electronic control unit 40 supplies the driving signal to the fuel injection valve 16, so that the fuel amount corresponding to the calculated valve opening time TINJ(n) is injected and supplied to a cylinder currently in an intake stroke. The fuel amount supplied at this time is increased or decreased by a quantity corrected by the idling stabilizing correction factor value KID. When the fuel supply amount is increased, the engine torque will be increased accordingly; when the fuel supply amount is decreased, the engine torque will be decreased accordingly.

In the embodiment described above, the target torque improvement rate Mi is set to the value which varies in dependence on the ratio of the instantaneous value of the stroke period τe to the value obtained by subjecting the instantaneous value to the first order delay processing, but it may alternatively be set to a value based on a ratio of the instantaneous value of the engine speed Ne to a value Ne' obtained by subjecting the instantaneous value to the first order delay processing although the arithmetic operation speed may be slightly lower. In this case, the target torque improvement rate Mi is calculated according to a formula (9) given below:

$$Mi = Ne'/Ne \quad (9)$$

Figure 11:
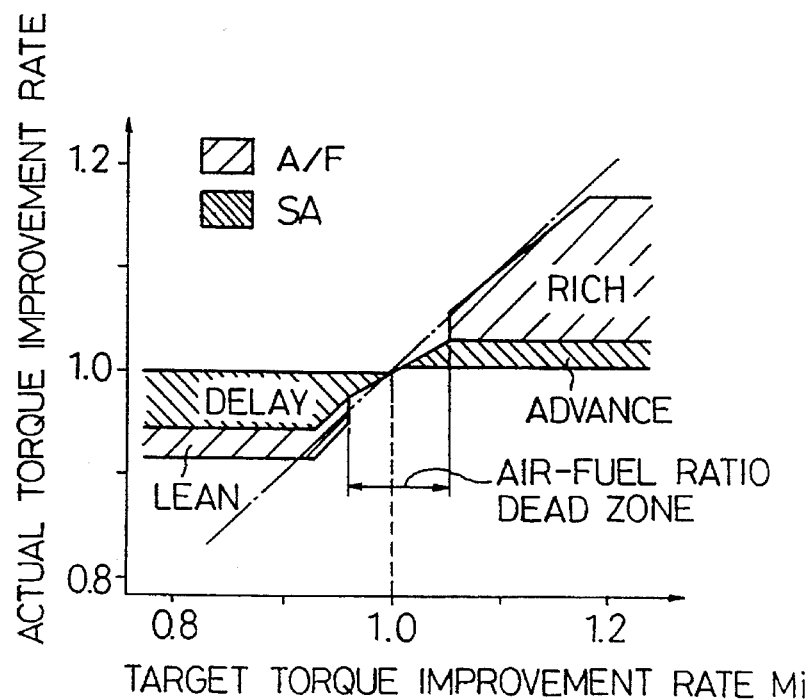
FIG. 11 is a graph showing a relationship between a target torque improvement rate and an actual torque improvement rate achieved by ignition timing and air-fuel ratio adjustments.

FIG. 11 shows the relationship between the target torque improvement rate Mi and the actual torque improvement rate. In the drawing, A/F indicates an area of torque improvement by the air-fuel-ratio adjustment, and SA indicates an area of torque improvement by the ignition timing adjustment. In the air-fuel ratio dead zone where the target torque improvement rate Mi is a value in the vicinity of the value 1.0, i.e., the absolute value of (Mi−1.0) is a minute value, the engine torque is controlled only by adjusting the ignition timing. Small combustion fluctuations unavoidably take place in the cylinders of the engine. In an area wherein fine adjustment of the engine torque is necessary, i.e., in the air-fuel ratio dead zone, the torque control by the air-fuel ratio adjustment is accompanied by a delay of 2 to 3 strokes, but the torque control by the ignition timing adjustment causes a delay of only about 1 to 2 strokes. Therefore, accurate torque control can be achieved by the ignition timing adjustment. For this reason, in the air-fuel ratio dead zone wherein the absolute value of (Mi−1.0) is a minute value, it is desirable to prohibit the torque control based on the air-fuel ratio but to conduct the torque control based only on the ignition timing.

Figure 12:
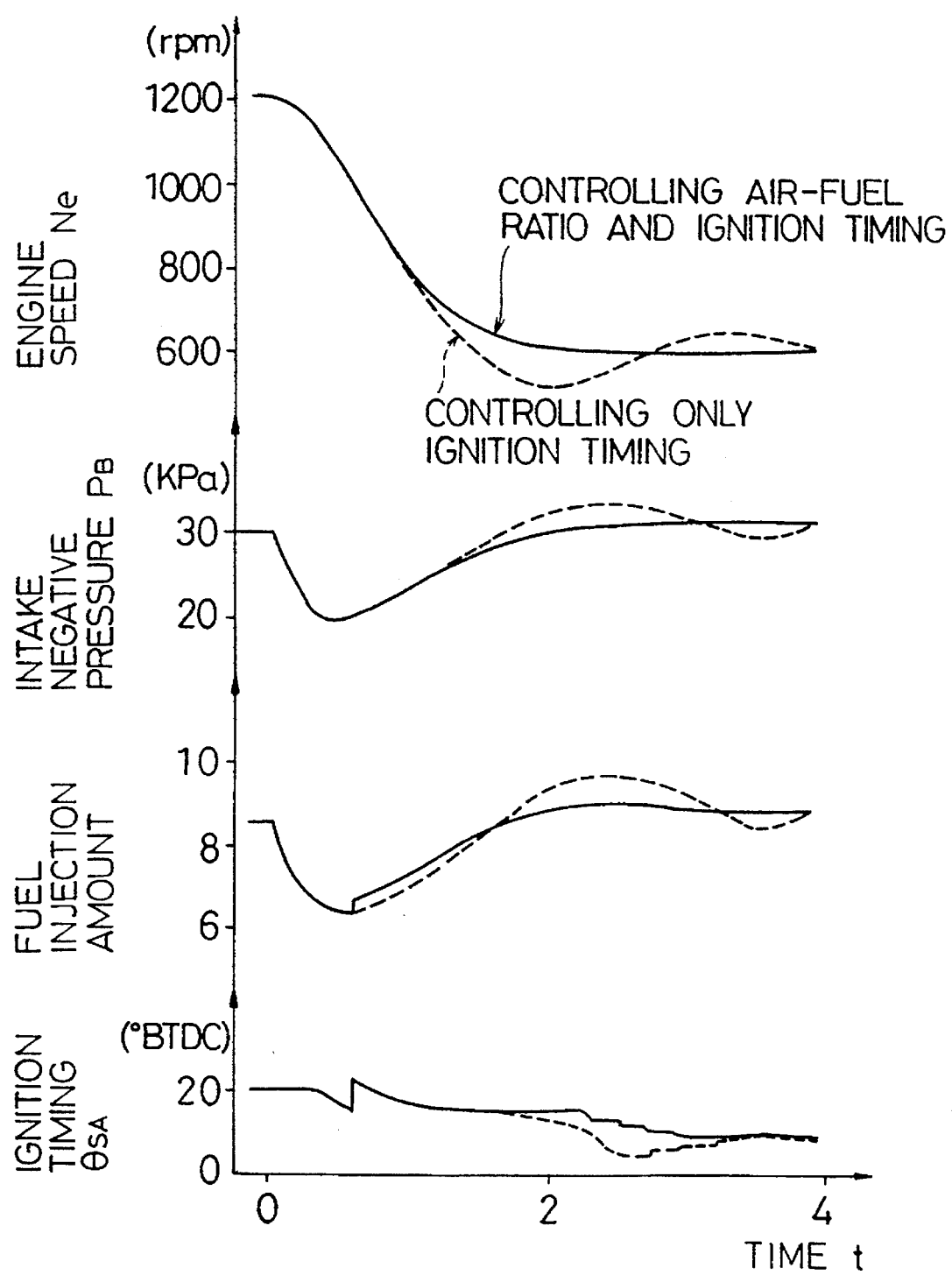
FIG. 12 is a graph showing time-dependent changes in engine speed Ne, negative pressure PB in the inlet pipe, fuel injection amount, and ignition timing θSA.

FIG. 12 shows time-dependent changes in the engine speed Ne, the negative pressure PB in the inlet pipe, the fuel injection amount, and the ignition timing θSA when the engine speed Ne is dropped from 1200 rpm to the target idling speed 600 rpm. In the drawing, the solid lines indicate the changes caused when both the air-fuel ratio control and the ignition timing control according to the present invention are conducted, while the dotted lines indicate the changes caused when only the ignition timing control is conducted. Judging from the changes in the engine speed Ne, it is obvious that, according to the method of the present invention, the target idling speed is reached very smoothly without an occurrence of hunting.

In the embodiment described above, the present invention is applied to the engine control unit designed to control the air-fuel ratio and the ignition timing by the D-jetronic system, but the present invention is not limited to the D-jetronic type engine; it can also be applied to the L-jetronic type engine which employs an air flow sensor.

In addition, the idling speed control unit is, of course, not limited to the type described in the embodiment and designed to open or close the bypass valve 28 to regulate the intake air amount; the method of the present invention may be applied to an apparatus designed to adjust the intake air amount by forcibly opening or closing the throttle valve in the vicinity of the fully closed position independently of an depression amount of the accelerator pedal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In an idling speed control system for adjusting an amount of intake air supplied to an internal combustion engine by controlling an engine output torque so that an engine speed matches a target speed when the engine is idling, an idling speed control method comprising the steps of:

(a) detecting a value of a predetermined parameter representative of a rotation state of an engine output shaft;

(b) predicting a torque correction factor, indicative of excess or deficiency of an engine output torque due to a response delay in an intake system of the engine, in accordance with the detected value of the predetermined parameter; and (c) controlling the engine output torque in accordance with the predicted torque correction factor, wherein an instantaneous value of the predetermined parameter is further detected, the detected instantaneous value is subjected to first order delay processing, a ratio of the detected instantaneous value of the predetermined parameter to a value obtained by the first order delay processing is determined, and the torque correction factor is predicted in step (b) in accordance with the determined ratio.

2. The idling speed control method of claim 1, wherein a value of the predetermined parameter is calculated after first order delay processing in accordance with an arithmetic function represented as a function of the instantaneous value of the predetermined parameter, a value obtained by first order delay processing, and a weight constant equivalent to a time constant.

3. The idling speed control method of claim 2, wherein the weight constant is represented as a function of a volume of an inlet pipe of the engine and a volume of one cylinder of the engine.

4. The idling speed control method of claim 1, wherein the intake air amount is adjusted in accordance with a difference between a detected value of the engine speed and a target idling speed.

5. The idling speed control method of claim 1, wherein the engine output torque is controlled by correcting at least one of an ignition timing of the engine and a fuel supply amount in accordance with the predicted torque correction factor.

6. The idling speed control method of claim 5, wherein the correction of the fuel supply amount is prohibited upon determining that the torque correction factor is within a predetermined range, and only the ignition timing is corrected in accordance with the torque correction factor.

7. The idling speed control method of claim 6, wherein the predetermined range of the torque correction factor, within which the correction of the fuel supply amount is prohibited, is set to a range wherein the torque correction factor takes a minute value.

8. The idling speed control method of claim 5, wherein at least one of a lean limit value and rich limit value of a correction amount of the fuel supply amount is provided, and the correction amount is limited to the at least one limit value.

9. The idling speed control method of claim 8, wherein the lean limit value of the correction amount is set to a value such that, if the correction amount exceeds the set lean limit value, misfire may occur in the engine, and the rich limit value is set to a value such that, if the correction amount exceeds the set rich limit value, the engine output torque does not effectively increase.

10. The idling speed control method of claim 5, wherein at least one of an advance limit value and delay limit value of a correction amount of the ignition timing is provided, and the correction amount is limited to the at least one limit value.

11. The idling speed control method of claim 10, wherein the advance limit value of the correction amount is set to a value such that, if the correction amount exceeds the set advance limit value, the engine output torque does not effectively increase, and the delay limit value is set to a value such that, if the correction amount equals the delay limit value, the engine output torque decreases by a specified rate.

12. In an idling speed control system for adjusting an amount of intake air supplied to an internal combustion engine by controlling an engine output torque so that engine speed matches a target speed when the engine is idling, an idling speed control method comprising the steps of:

(a) determining a stroke period of the engine;

(b) determining an instantaneous value of the determined stroke period;

(c) subjecting the determined instantaneous value to first order delay processing to obtain a second value;

(d) predicting a torque correction factor, indicative of excess or deficiency of an engine output torque due to a response delay in an intake system of the engine, from a ratio of the determined instantaneous value of step (b) to the obtained second value of step (c); and (e) controlling the engine output torque in accordance with the predicted torque correction factor of step (d).

13. The idling speed control method of claim 12, wherein a value of the stroke period after first order delay processing is calculated in accordance with an arithmetic function represented as a function of the instantaneous value of the stroke period, a value obtained by first order delay processing, and a weight constant equivalent to a time constant.

14. The idling speed control method of claim 13, wherein the weight constant is represented as a function of a volume of an inlet pipe of the engine and a volume of one cylinder of the engine.

15. The idling speed control method of claim 12, wherein the intake air amount is adjusted in accordance with a difference between a detected value of the engine speed and a target idling speed.

16. The idling speed control method of claim 12, wherein the engine output torque is controlled by correcting at least one of an ignition timing of the engine and a fuel supply amount in accordance with the predicted torque correction factor.

17. The idling speed control method of claim 16, wherein the correction of the fuel supply amount is prohibited upon determining that the torque correction factor is within a predetermined range, and only the ignition timing is corrected in accordance with the torque correction factor.

18. The idling speed control method of claim 17, wherein the predetermined range of the torque correction factor, within which the correction of the fuel supply amount is prohibited, is set to a range wherein the torque correction factor takes a minute value.

19. The idling speed control method of claim 16, wherein at least one of a lean limit value and rich limit value of a correction amount of the fuel supply amount is provided, and the correction amount is limited to the at least one limit value.

20. The idling speed control method of claim 19, wherein the lean limit value of the correction amount is set to a value such that, if the correction amount exceeds the set lean limit value, misfire may occur in the engine, and the rich limit value is set to a value such that, if the correction amount exceeds the set rich limit value, the engine output torque does not effectively increase.

21. The idling speed control method of claim 16, wherein at least one of an advance limit value and delay limit value of a correction amount of the ignition timing is provided, and the correction amount is limited to the at least one limit value.

22. The idling speed control method of claim 21, wherein the advance limit value of the correction amount is set to a value such that, if the correction amount exceeds the set advance limit value, the engine output torque does not effectively increase, and the delay limit value is set to a value such that, if the correction amount equals the delay limit value, the engine output torque decreases by a specified rate.

23. In an idling speed control system for adjusting an amount of intake air supplied to an internal combustion engine by controlling an engine output torque so that engine speed matches a target speed when the engine is idling, an idling speed control method comprising the steps of:

(a) determining a speed of the engine:

(b) determining an instantaneous value of the determined engine speed;

(c) subjecting the determined instantaneous value to first order delay processing to obtain a second value;

(d) predicting a torque correction factor, indicative of excess or deficiency of an engine output torque due to a response delay in an intake system of the engine, from a ratio of the determined instantaneous value of step (b) to the obtained second value of step (c); and (e) controlling the engine output torque in accordance with the predicted torque correction factor of step (d).

24. The idling speed control method of claim 23, wherein a value of the engine speed after first order delay processing is calculated in accordance with an arithmetic function represented as a function of the instantaneous value of the engine speed, a value obtained after first order delay processing, and a weight constant equivalent to a time constant.

25. The idling speed control method of claim 24, wherein the weight constant is represented as a function of a volume of an inlet pipe of the engine and a volume of one cylinder of the engine.

26. The idling speed control method of claim 23, wherein the intake air amount is adjusted in accordance with a difference between a detected value of the engine speed and a target idling speed.

27. The idling speed control method of claim 23, wherein the engine output torque is controlled by correcting at least one of an ignition timing of the engine and a fuel supply amount in accordance with the predicted torque correction factor.

28. The idling speed control method of claim 27, wherein the correction of the fuel supply amount is prohibited upon determining that the torque correction factor is within a predetermined range, and only the ignition timing is corrected in accordance with the torque correction factor.

29. The idling speed control method of claim 28, wherein the predetermined range of the torque correction factors within which the correction of the fuel supply amount is prohibited, is set to a range wherein the torque correction factor takes a minute value.

30. The idling speed control method of claim 27, wherein at least one of a lean limit value and rich limit value of a correction amount of the fuel supply amount is provided, and the correction amount is limited to the at least one limit value.

31. The idling speed control method of claim 30, wherein the lean limit value of the correction amount is set to a value such that, if the correction amount exceeds the set lean limit value, misfire may occur in the engine, and the rich limit value is set to a value such that, if the correction amount exceeds the set rich limit value, the engine output torque does not effectively increase.

32. The idling speed control method of claim 27, wherein at least one of an advance limit value and delay limit value of a correction amount of the ignition timing is provided, and the correction amount is limited to the at least one limit value.

33. The idling speed control method of claim 32, wherein the advance limit value of the correction amount is set to a value such that, if the correction amount exceeds the set advance limit value, the engine output torque does not effectively increase, and the delay limit value is set to a value such that, if the correction amount equals the delay limit value, the engine output torque decreases by a specified rate.

34. In an idling speed control system for adjusting an amount of intake air supplied to an internal combustion engine by controlling an engine output torque so that an engine speed matches a target speed when the engine is idling, an idling speed control apparatus comprising:

first means for detecting a value of a predetermined parameter representative of a rotation state of an engine output shaft;

second means for predicting a torque correction factor, indicative of excess or deficiency of an engine output torque due to a response delay in an intake system of the engine, in accordance with the detected value of the predetermined parameter; and third means for controlling the engine output torque in accordance with the predicted torque correction factor, wherein an instantaneous value of the predetermined parameter is further detected by the first means, and the second means subjects the detected instantaneous value to first order delay processing, determines a ratio of the instantaneous value of the predetermined parameter to a value obtained by the first order delay processing, and predicts the torque correction factor in accordance with the determined ratio.

35. The idling speed control apparatus of claim 34, wherein the first means detects a stroke period of the engine as the predetermined parameter, and the second means determines an instantaneous value of the stroke period, subjects the determined instantaneous value of the stroke period to first order delay processing to obtain a second value, and predicts the torque correction factor in accordance with a ratio of the determined instantaneous value to the obtained second value.

36. The idling speed control apparatus of claim 34, wherein the first means detects an engine speed as the predetermined parameter, and the second means determines an instantaneous value of the engine speed, subjects the determined instantaneous value of the engine speed to first order delay processing to obtain a second value, and predicts the torque correction factor in accordance with a ratio of the determined instantaneous value to the obtained second value.

37. The idling speed control apparatus of claim 34, wherein the second means calculates a value of the predetermined parameter after first order delay processing in accordance with an arithmetic function represented as a function of the instantaneous value of the predetermined parameter, a value obtained by first order delay processing, and a weight constant equivalent to a time constant.

38. The idling speed control apparatus of claim 37, wherein the weight constant is represented as a function of a volume of an inlet pipe of the engine and a volume of one cylinder of the engine.

39. The idling speed control apparatus of claim 34, wherein the intake air amount is adjusted in accordance with a difference between a detected value of the engine speed and a target idling speed.

40. The idling speed control apparatus of claim 34, wherein the third means controls engine output torque by correcting at least one of an ignition timing of the engine and a fuel supply amount in accordance with the predicted torque correction factor.

41. The idling speed control apparatus of claim 40, wherein the correction of the fuel supply amount is prohibited upon determining that the torque correction factor is within a predetermined range, and only the ignition timing is corrected by the third means in accordance with the torque correction factor.

42. The idling speed control apparatus of claim 41, wherein the predetermined range of the torque correction factor, within which the correction of the fuel supply amount is prohibited, is set to a range wherein the torque correction factor takes a minute value.

43. The idling speed control apparatus of claim 40, wherein at least one of a lean limit value and rich limit value of a correction amount of the fuel supply amount is provided, and the correction amount is limited to the at least one limit value.

44. The idling speed control apparatus of claim 43, wherein the lean limit value of the correction amount is set to a value such that, if the correction amount exceeds the set lean limit value, misfire may occur in the engine, and the rich limit value is set to a value such that, if the correction amount exceeds the set rich limit value, the engine output torque does not effectively increase.

45. The idling speed control apparatus of claim 40, wherein at least one of an advance limit value and delay limit value of a correction amount of the ignition timing is provided, and the correction amount is limited to the at least one limit value.

46. The idling speed control apparatus of claim 45, wherein the advance limit value of the correction amount is set to a value such that, if the correction amount exceeds the set advance limit value, the engine output torque does not effectively increase, and the delay limit value is set to a value such that, if the correction amount equals the delay limit value, the engine output torque decreases by a specified rate.

* * * * *